US008161147B2

(12) United States Patent
Verma et al.

(10) Patent No.: US 8,161,147 B2
(45) Date of Patent: Apr. 17, 2012

(54) METHOD OF ORGANISING SERVERS

(75) Inventors: Sanjeev Verma, Burlington, MA (US);
Ram Gopal Lakshmi Narayanan, Hudson, NH (US)

(73) Assignee: Intellectual Ventures I LLC, Wilmington, DE (US)

( * ) Notice: Subject to any disclaimer, the term of this patent is extended or adjusted under 35 U.S.C. 154(b) by 1142 days.

(21) Appl. No.: 11/046,805

(22) Filed: Feb. 1, 2005

(65) Prior Publication Data
US 2005/0177572 A1 Aug. 11, 2005

(30) Foreign Application Priority Data

Feb. 5, 2004 (GB) .................................. 0402572.2

(51) Int. Cl.
*G06F 15/173* (2006.01)

(52) U.S. Cl. ........ 709/223; 709/220; 709/226; 709/200; 714/4; 714/15

(58) Field of Classification Search .................. 709/223, 709/220, 226; 707/10; 714/100, 4, 15
See application file for complete search history.

(56) References Cited

U.S. PATENT DOCUMENTS

| | | | | | |
|---|---|---|---|---|---|
| 5,522,042 | A | * | 5/1996 | Fee et al. | 709/226 |
| 5,566,297 | A | * | 10/1996 | Devarakonda et al. | 714/15 |
| 5,983,371 | A | * | 11/1999 | Lord et al. | 714/55 |
| 6,014,669 | A | * | 1/2000 | Slaughter et al. | 707/610 |
| 6,052,733 | A | * | 4/2000 | Mahalingam et al. | 709/235 |
| 6,058,449 | A | * | 5/2000 | Linzmeier et al. | 710/107 |
| 6,088,328 | A | * | 7/2000 | McKnight | 370/216 |
| 6,134,678 | A | * | 10/2000 | Mahalingam et al. | 714/48 |
| 6,178,445 | B1 | * | 1/2001 | Dawkins et al. | 709/209 |
| 6,272,113 | B1 | * | 8/2001 | McIntyre et al. | 370/248 |
| 6,411,506 | B1 | * | 6/2002 | Hipp et al. | 361/679.41 |
| 6,470,382 | B1 | * | 10/2002 | Wang et al. | 709/220 |
| 6,490,632 | B1 | * | 12/2002 | Vepa et al. | 709/250 |
| 6,512,774 | B1 | * | 1/2003 | Vepa et al. | 370/401 |
| 6,556,547 | B1 | * | 4/2003 | Srikanth et al. | 370/317 |
| 6,560,656 | B1 | * | 5/2003 | O'Sullivan et al. | 709/250 |
| 6,578,066 | B1 | * | 6/2003 | Logan et al. | 718/105 |
| 6,581,166 | B1 | * | 6/2003 | Hirst et al. | 714/4 |
| 6,683,882 | B1 | * | 1/2004 | Maufer et al. | 370/401 |
| 6,728,875 | B1 | * | 4/2004 | Aguilar et al. | 713/2 |
| 6,744,819 | B1 | * | 6/2004 | Chu et al. | 375/242 |
| 6,810,259 | B1 | * | 10/2004 | Zhang | 455/456.5 |
| 6,871,300 | B1 | * | 3/2005 | Irving | 714/47 |
| 6,915,445 | B2 | * | 7/2005 | Navar et al. | 714/4 |

(Continued)

FOREIGN PATENT DOCUMENTS

WO  WO 01/95564 A2  12/2001

(Continued)

OTHER PUBLICATIONS

The International Search Report for PCT/IB2005/000269 mailed on Apr. 11, 2005.

(Continued)

*Primary Examiner* — John Follansbee
*Assistant Examiner* — Anthony Mejia

(57) ABSTRACT

A method of organizing a plurality of servers defines a set of servers. The method also defines one of the servers of the set of servers as a server which is configured to control the communication of information to other servers in the set to support heterogeneous application requirements and interoperability between hardware and software systems.

42 Claims, 5 Drawing Sheets

U.S. PATENT DOCUMENTS

| | | | |
|---|---|---|---|
| 6,941,350 B1* | 9/2005 | Frazier et al. | 709/209 |
| 6,986,033 B2* | 1/2006 | Miyamoto et al. | 713/1 |
| 7,023,849 B2* | 4/2006 | Moriwaki et al. | 370/390 |
| 7,069,428 B2* | 6/2006 | Miyamoto et al. | 713/1 |
| 7,170,887 B2* | 1/2007 | Rosenberg | 370/352 |
| 7,266,595 B1* | 9/2007 | Black et al. | 709/223 |
| 7,337,224 B1* | 2/2008 | Van Horne, III et al. | 709/225 |
| 7,349,960 B1* | 3/2008 | Pothier et al. | 709/224 |
| 7,487,500 B1* | 2/2009 | McCracken et al. | 717/177 |
| 7,523,341 B2* | 4/2009 | Hufferd et al. | 714/6.3 |
| 7,590,136 B1* | 9/2009 | Parker et al. | 370/419 |
| 7,934,035 B2* | 4/2011 | Miloushev et al. | 710/244 |
| 2001/0052084 A1* | 12/2001 | Huang et al. | 714/4 |
| 2002/0049845 A1* | 4/2002 | Sreenivasan et al. | 709/226 |
| 2002/0087762 A1* | 7/2002 | Leung | 710/72 |
| 2002/0103921 A1* | 8/2002 | Nair et al. | 709/232 |
| 2002/0161868 A1* | 10/2002 | Paul et al. | 709/221 |
| 2002/0166020 A1* | 11/2002 | Irving et al. | 710/301 |
| 2003/0014526 A1* | 1/2003 | Pullara et al. | 709/227 |
| 2003/0023701 A1* | 1/2003 | Norman et al. | 709/214 |
| 2003/0023709 A1* | 1/2003 | Alvarez et al. | 709/223 |
| 2003/0035408 A1* | 2/2003 | Hebert | 370/349 |
| 2003/0037283 A1* | 2/2003 | Srinivasan et al. | 714/11 |
| 2003/0046604 A1* | 3/2003 | Lau et al. | 714/11 |
| 2003/0054821 A1* | 3/2003 | Kita et al. | 455/435 |
| 2003/0069953 A1* | 4/2003 | Bottom et al. | 709/223 |
| 2003/0135585 A1* | 7/2003 | Binder | 709/219 |
| 2004/0034807 A1* | 2/2004 | Rostowfske | 714/4 |
| 2004/0049714 A1* | 3/2004 | Marples et al. | 714/43 |
| 2004/0267960 A1* | 12/2004 | Riedle | 709/241 |
| 2005/0080923 A1* | 4/2005 | Elzur | 709/238 |
| 2005/0159927 A1* | 7/2005 | Cruz et al. | 702/188 |
| 2005/0198375 A1* | 9/2005 | Hwang et al. | 709/238 |
| 2005/0201272 A1* | 9/2005 | Wang et al. | 370/216 |
| 2006/0136709 A1* | 6/2006 | Miyamoto et al. | 713/2 |
| 2010/0100905 A1* | 4/2010 | Sequeira | 725/39 |
| 2011/0116362 A1* | 5/2011 | Singatwaria | 370/216 |

FOREIGN PATENT DOCUMENTS

| | | |
|---|---|---|
| WO | WO 02/01413 A1 | 1/2002 |

OTHER PUBLICATIONS

The Written Opinion for PCT/IB2005/000269.

* cited by examiner

HA Interface Reference

HA Group and hierarchy

HAS reference

HA-ID assignment procedures

RHAS reassignment (a) RHAS with HA-ID has shutdown. New RHAS is selected automatically (b) HAS which was earlier with HA-ID = 1 in last session is restarted and will be join as a new HAS with a new HA ID.

Switch over operation in a HA-SET

METHOD OF ORGANISING SERVERS

FIELD OF THE INVENTION

The present invention relates to a method of organising servers.

BACKGROUND TO THE INVENTION

Highly available systems are designed to protect against network and operational failures. To support high availability (HA) in telephony networks, redundancy is built into each network element. Availability of a system is defined as the probability that the system provides correct Service delivery at a certain time 't'. Its a measure of correct service delivery with respect to the alternation of correct and incorrect service, measured by the probability A(t) that the system is ready to provide the service at a point in time t.

However, the Internet currently provides redundancy in the network as a whole rather than in each individual network element. In the Internet, the networks do not maintain states for individual user sessions. Rather, redundancy is provided through alternate routing paths in the Internet. In this instance, if a user sends a packet to another user the packet goes through the routing infrastructure. If a failure occurs in the network element, the path may not be active any more and the routing elements detect this failure and finds a suitable alternative path. This process takes time and the routing system performs self stabilization to overcome this failure.

The internet is a decentralised, fast growing network and it adapts itself to new changing requirements to incorporate new services such as voice over IP (internet protocol) (VoIP), virtual private network (VPN), quality of service (QoS) etc.

In addition, as wireless and Internet technologies converge, new requirements will need to emerge to support seamless real time services. This will place a very high demand on per hop packet processing on each network element in the Internet. To support the growing of such needs the network element needs to delivery high performance, and scalability. To meet these demands, networks elements such as routers have evolved from a monolithic software entity to distributed software and hardware entity. To support converged network service, network elements like routers may need to maintain per flow or per user information states to satisfy the service requirements. If such a network element fails, failover operation should be fast and the user of the service should notice no service distruption. Thus, each network elements in the Internet may need to provide high availability features in order to avoid disruption in the service. This suggests that network elements should support high availability features such as failover, load balancing, state replication etc.

Recent advancements in network processor technology have made it possible to present network functions as configurable and programmable modules.

The idea for establishing open interfaces in the control and forwarding plane enables a new building block approach in system architecture design which has demanded open interfaces for multi vendor operation. In this regard, reference is made to the network processing forum (www.npforum.org).

Network elements are provided with control cards and line cards. Routers or switches, which are based on a distributed architecture, are composed of one or more line cards and one or more control cards. A control card contains service logic and applications to perform control (signalling) and management of service functions. The control card typically contains one or more applications of logic to perform routing, QoS, security, mobility and charging services.

A line card in a distributed network element performs forwarding functions. It performs fast packet forwarding on a data path. In addition to forwarding, it also performs minimal signalling or filtering functions. Control cards provide instructions in the form of messages and program line card logic. The line card processes each incoming and outgoing packets and if any exceptions are encountered in a process a packet it will inform the control card. In order to provide a seamless continuous service, the control cards and line cards inside the network element need to synchronise amongst themselves and provide a single system viewed from the outside world. Although there are several standardisation efforts to provide higher availability in routing protocols, middleware and applications, they all make the assumption that the HA middleware is a single monolithic entity. The purpose of the middleware is to provide transparency. The following are middleware services.

High availability.
   Access transparency (Location+network)
   Database transparency
   Fault tolerance etc.

At the network processing forum NPF, efforts are being made to make open interfaces to the HA middleware itself and enable multiple vendor HA middleware components to inter-act to form a unified HA middleware. However, there is no proposal or suggestion with the current systems to provide a HA system which enables multi-vendor inter-operable solutions. Rather, they provide APIs (application program interface) to run various applications in a single middleware entity. At NPF, the focus is to enable multi vendor interoperable mechanisms with the HA middleware itself being formed by several multi vendor HA daemons. HA Daemons are server applications that get started in each control card or line card. For example, when a router or switch is started (booted up or powered up), the operating system starts each process as part of an initial routine. HA daemons are one such process that is started automatically in each control or line card.

Applications like VoIP and other services require per hop behaviour processing and these network elements need to maintain states. When a network element fails, there should be an alternative network element that should take the state of a failed network element. At present, there are several proprietary solutions, which provide control card redundancy, line card redundancy or network element redundancy. However, there is no open standard protocol or mechanism that exists for providing control card and line card redundancy mechanisms. Rather, vendors will provide their own redundancy mechanisms and solutions. For network element redundancy, the mechanisms proposed in IETF (internet engineering task force) proposals are coarse and do not take care of all state synchronisations of the application nor do they provide a single system image view. Rather, the mechanisms are mainly targeted for network protocols and not for network services such as VoIP state maintenance. This also requires redesigning the existing applications and does not account for heterogeneous multivendor software and hardware.

CGL (carrier grade LINUX) is mainly targeted for LINUX and proposes the extension to the basic POSIX (Portable Operating System Interface Reference—http://www.pasc.org/#POSIX) system calls and it uses the service availability forum's API and the focus is the same as the service availability forum.

IETF virtual router redundancy protocol (VRRP) is a simple heart beat mechanism to detect the network element failure. It does not provide a single system image. It is a network protocol and does not accommodate check pointing and other event management servers.

Common object request broker architecture (CORBA) is a middleware service that mainly supports network access. CORBA has recently added fault tolerance plug in the components. CORBA provides API implementation and enables interoperable applications. It is applicable to network elements but its fast path processing is limited. Interoperability with different CORBA domains has a lot of issues although IIOP (IIOP—Internet Interoperability protocol Reference;— http://www.omg.org/technology/documents/formal/corba_i-iop.htm) enables them to perform such communication that requires complex processing.

There are various network elements from for example Cisco, Juniper and other vendors. However, they do not support multi-vendor and open interface protocols. These solutions require a lot of configuration and the boot-strapping procedure is hard coded and is not flexible.

In summary none of the known systems enable multiple HA servers to be in a single HA middleware that works with heterogeneous HA servers and provides interoperability between multi vendor hardware and software systems.

Embodiments of the present invention seek to mitigate or obviate the problems with the current proposals.

SUMMARY OF THE INVENTION

According to one aspect of the present invention there is provided a method of organizing at least two servers, the method comprising the steps of: defining a set of servers comprising at least two servers, said set of servers being arranged to run on different functional units and to manage the same set of resources; and defining a server of said set of servers to control at least one predetermined function of at least one other server in said set.

According to another aspect of the present invention there is provided a plurality of servers organized in a set, said set of servers being arranged to run on different functional units and to manage the same set of resources wherein a server of said servers of said set is configured to control least one predetermined function of at least one other server in said set.

According to yet another aspect of the present invention there is provided middleware comprising: a plurality of servers organized in a set, said servers being arranged to run on different functional units and to manage the same set of resources, wherein a server of said plurality of servers in said set comprises the server to control at least one predetermined function of at least one other server in said set.

According to yet another aspect of the present invention there is provided a system for organizing a plurality of servers, the system comprising: first defining means for defining a set of servers, said servers being arranged to run on different functional units and to manage the same set of resources; and second defining means for defining a server of said servers of said set of servers to control at least one predetermined function of at least one other server in said set.

According to yet another aspect of the present invention there is provided a method of organizing at least two computers, the method comprising the steps of: defining a set of computers comprising at least two computers, said set of computers being arranged to run on different functional units and to manage the same set of resources; and defining a computer of said set of computers to control at least one predetermined function of at least one other computer in said set.

According to yet another aspect of the present invention there is provided a server configured to control at least one predetermined function of at least one other server in a set of servers in which said set of servers is configured to run on different functional units and to manage the same set of resources.

According to yet another aspect of the present invention there is provided a backup server configured to provide a backup function to a controlling server configured to control at least one predetermined function of at least one other server in a set of servers in which said set of servers is configured to run on different functional units and to manage the same set of resources, said back up function comprising controlling at least one predetermined function of at least one other server in said set of servers when said controlling server is not operational.

BRIEF DESCRIPTION OF DRAWINGS

For a better understanding of the present invention and as to how the same may be carried into effect, reference will now be made by way of example only to the following drawings in which.

DETAILED DESCRIPTION OF EMBODIMENTS OF THE PRESENT INVENTION

Embodiments of the present invention provide an open HA middleware architecture for a distributed network element where the control and line cards may be from different vendors. Additionally, the control and line cards support third party applications. Embodiments of the present invention seek to provide a system, which is a plug and play system that supports heterogeneous software and hardware components. In order that the systems work co-operatively and provide high availability, smooth fail over and redundancy are supported both at the application and the control/line card levels by implementing an open HA middleware. The HA middleware itself is composed of various HA servers or HA daemons running on each control or line card. In the arrangement of embodiments of the present invention, the HA servers need to discover themselves first and then provide HA services to both software and hardware contained in the network element. Embodiments of the invention provide an automatic boot-up procedure for HA Servers in a heterogeneous, multi-vendor network element In embodiments of the invention, each card when it comes up in a network element, discovers every other card in the network element, then each card describes their capabilities and how they are configured to other HA servers in the systems. The HA server that was started first in the control card has complete knowledge about what services need to be enabled and how the monitoring of the system should be performed. Once this information is provided to a just booted control or line card, they will start functioning and provide the notion of a distributed network element.

Middleware exists between a client and server machine.— Middleware is often provided by software. A collection of HA Servers running in each line or control card provide the notion of HA middleware to applications that are running in the control and line cards. Middleware provides location, access, network, database transparency. In other words, the user has no information about the routing of the connection between the user and the destination. In embodiments of the invention, the middleware may be provided by the network element made up of a plurality of line and/or control cards.

Figure 1:
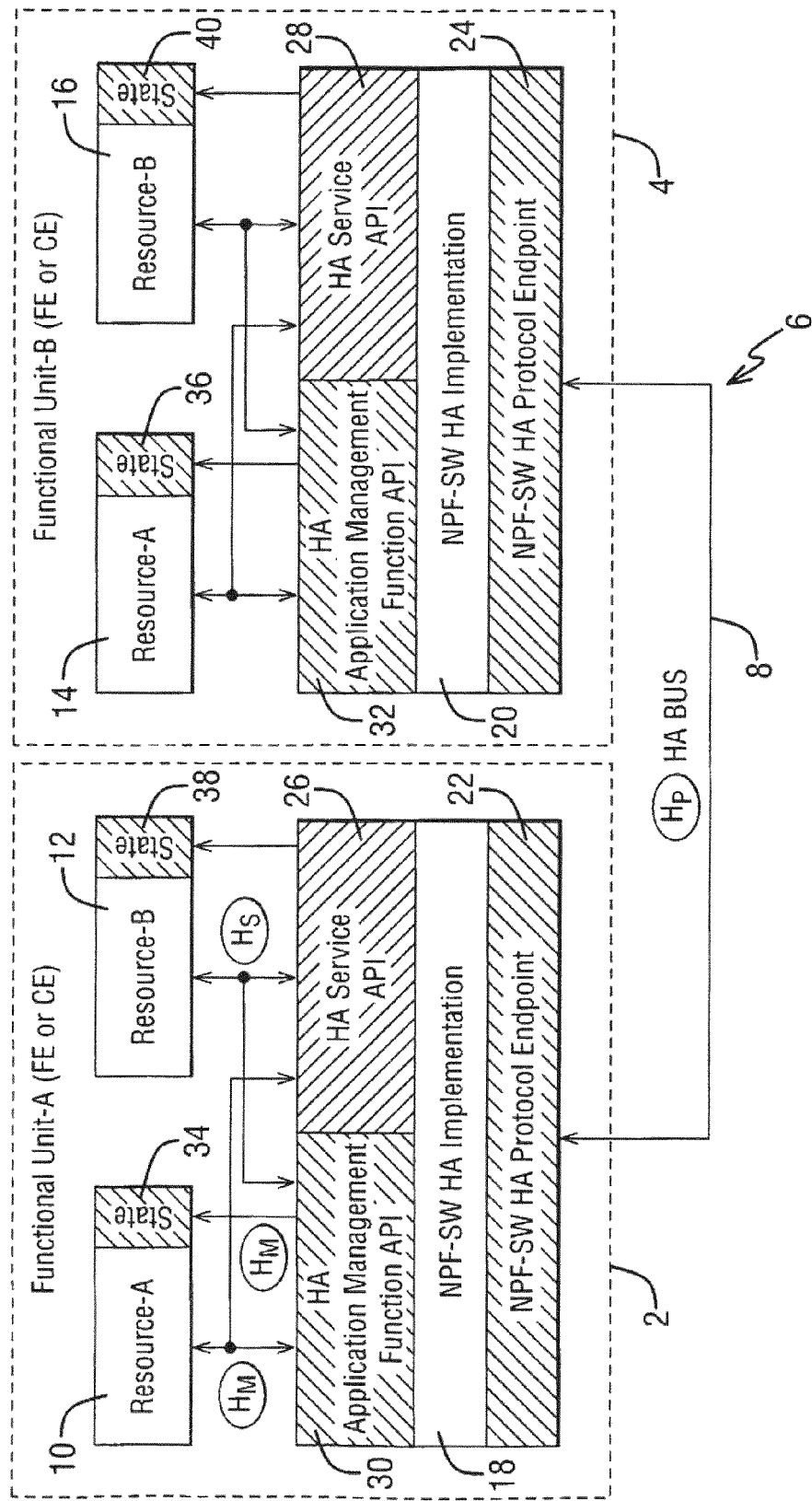
FIG. 1 shows a high availability architecture highlighting various reference points.

Reference is made to FIG. 1, which shows various reference points that are provided in the NPF HA architecture. Two functional units 2 and 4 are shown. A functional unit is either a control card or a line card. The network element 6 is thus composed of one or more line card and/or control cards and is organised in a distributed network architecture. In embodiments of the present invention, the control cards and/or line cards can come from the same or different vendors and also it may contain software components from the same or different vendors. In embodiments of the present invention, a distributed network architecture is provided where a network element is composed of more than one control card and/or line card and line card and/or control card redundancy is provided. The HA server or HA daemon will be running in all the control and line cards. In some embodiments of the present invention there may be a proxy HA server for dumb line cards. A line card can be either intelligent or non intelligent (Dumb). An intelligent line card contains logic to take decisions. Typically it will have a CPU, operating system as a local processor. Dumb line cards contain only forwarding logic. The control card controls the complete configuration, management and monitoring of each parts of the dumb line card.

The HA server (HAS) provider uses HA protocol and communicates over the HA bus 8. As can be seen, the two functional units shown in FIG. 1 are connected together via the HA bus. The HA bus is a software concept and it can be an IP (internet protocol) or a PCI (peripheral component interconnect) or a non IP interconnect. In embodiments of the present invention, there is a communication channel between the HA servers within the network element. The HA bus enables uniform message transport.

Applications that are running on control cards or line cards are called resources. Additionally dumb control managed by a control card is also called a resource. The first functional unit 2 has a resource A 10 and a resource B 12. Likewise, the second functional unit 4 has a first resource A 14 and a second resource B 16. When a resource gets started by operator, the resource registers with the HA middleware. Then the HA middleware seamlessly performs state synchronisation and detects the application failure and accordingly activates the standby system (if any) to the active state. Each control card/line card has a NPF software high availability implementation 18 and 20. This provides HA state management and monitoring functions and performs seamless switchover operations.

Each control or line card also comprises an NPF software high availability protocol end point 22 and 24 respectively. The HA bus is connected to the respective protocol end points of each of the functional units. The HA bus supports reliability, ordered delivery, congestion friendly mechanism for all HA messages.

Each functional unit also has a HA service API 26 and 28 respectively. This part of the functional unit is connected to the respective resources contained on that functional unit. Using HA Service API 26 and 28, the application server can update or inform their internal state to the HA server or they can communicate to their standby systems by sending an application specific event. When the application server (resources) is abnormally terminated and later restarted, it can perform warm restart. That is it can resume where from previous session settings/conditions before the abnormal termination or error occurred.

Also provided is a HA application management function API 30 and 32 in each of the functional units. The purpose of the HA application management function is to keep track of the registered HA applications and their operations.

The HA application management function API 30 and 32 are connected to respective state functions 34 and 36 of the first resource 10 and 14 respectively. HA States are states of the application and are maintained by the HA implementation. This is used as input for state management. Hm connection is an API interface. Likewise the HA service API is connected to a state function 38 and 40 of the respective second resources 12 and 16. Hm is the interface between the HA application management function API 30 or the HA service API and the resource A and its associated state. Hs is the interface between the HA application management function API 30 or the HA service API and the resource B and its associated state.

Embodiments of the present invention provide an open interface that allows for interoperability between components from different vendors. In embodiments of the present invention it is realised how a complete system comes up as a single HA middleware and is able to start providing HA services to the application. Embodiments of the present invention do not assume any transport medium. The proposed HA middleware boot strapping mechanism can be extended to network elements even if it spans multiple hops. Proposed mechanisms can scale to several hundreds of blades and provide a single system image to the external network. Scalability refers to number of services that can be added in a single network element to support HA. The solution will allow us to perform logical and physical portioning of a network element Reference is now made to FIG. 2, which shows a high availability group and architecture. The HA server is running in a functional unit The HAS server is constituted by elements 18, 26, 22 and 30 of the functional unit of FIG. 1. The HAS can be regarded as software which is arranged to run on the hardware ie the line or control card. The HAS running in a functional unit needs to maintain the state information of each resource distributed across several function units or depending upon the type of service and hardware it can share the distribution of the state by storing partial information. Application processes or local resources contained inside a control or line card are called resources.

When the number of functional units is large, for example hundreds of line cards or control cards, fail over operations may get very complicated, any resource status change needs to be propagated across the functional units so that the HAS running in each functional unit has the same system wide view. This may require unnecessary message exchanges amongst functional units.

Figure 2:
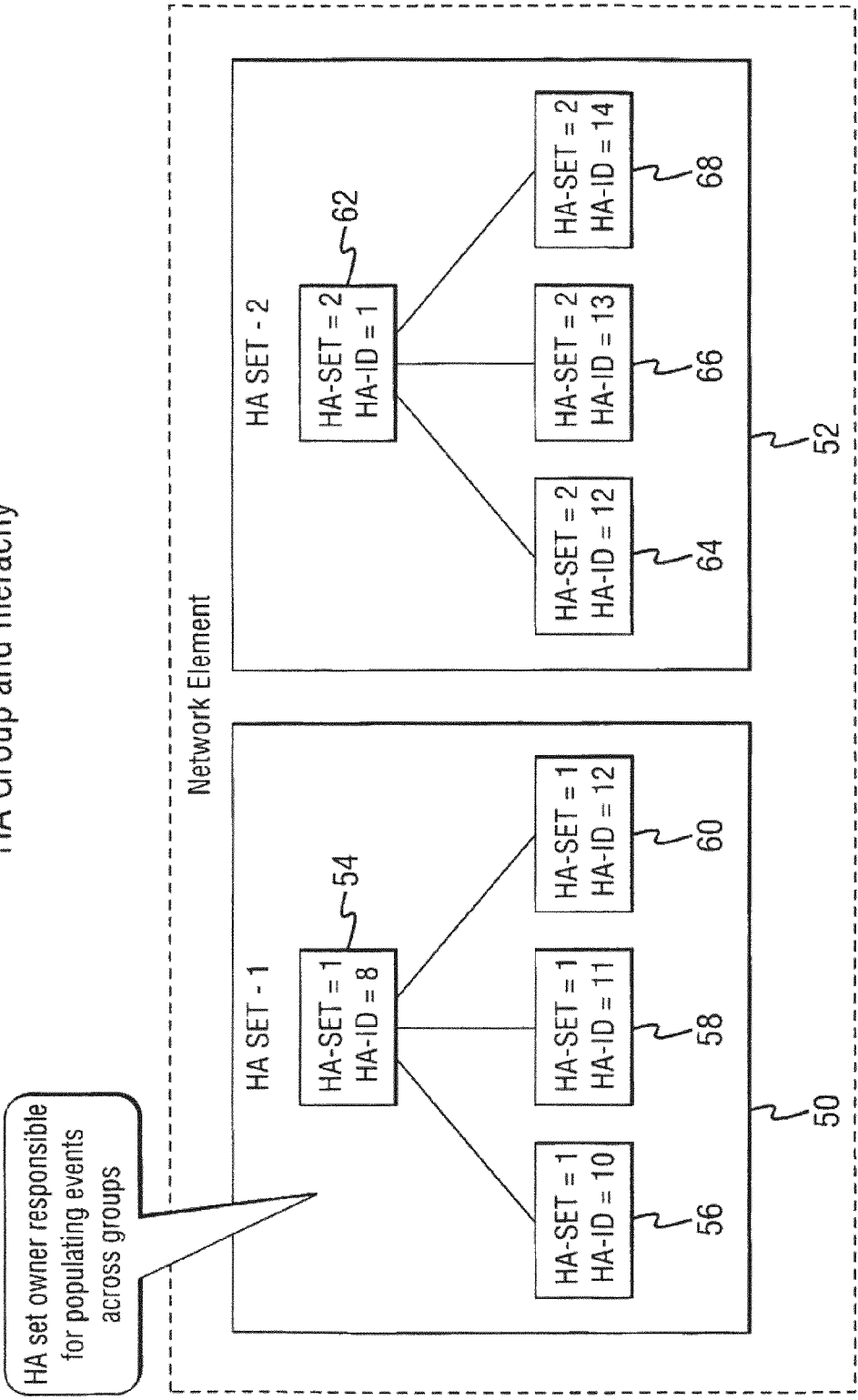
FIG. 2 illustrates a HA group and hierarchy within the groups.

In embodiments of the present invention, to minimise the unnecessary message exchanges, a set of functional units are grouped together. Functional units providing the same or similar services are grouped together into a set SET. In this regard, FIG. 2 shows a first set 50 and a second set 52.

The first set 50 comprises four functional units 54, 56, 58 and 60. The second set also comprises four functional units 62, 64, 66 and 68. It should be appreciated that different sets can have different numbers of functional units. A set can have more or less than four functional units. The HA set is a collection of HA servers that are running in different functional units and manage the same set of resources.

Each HA server in a set is given a HA set identifier. In other words, all of the HA servers shown in FIG. 1 have the same identifier which in this example is 1. The HA servers shown in FIG. 2 as belonging to set 2 all have the same set identifier for example 2. Thus, the HA servers in the different set have different set identifiers. The HA set identifier is unique under a network element and thus refers to the group of HASs. The HA set is thus referenced by a HA set ID. In one embodiment of the invention, the HA set-ID is a unique 16-bit integer value which is manually configured. In embodiments of the present invention, different number of bits can be used depending on the size of the network.

The HA server that is contained in a particular HA set needs to update and synchronise its states with other HASs in the same group. HA server manages applications that are running in line card or control card. The state of the application may be stopped, active, standby, etc. This mechanism allows the number of messages to be reduced, increases the manageability and scalability of the system.

When the operator starts the system normally the control card will be started first. The HAS server when it starts tries to discover other HA Servers in the network element. Since this is the first card booted by the operator it declares itself as the Root HA Server. FIG. 2 also illustrates the concept of a root HAS (RHAS). One HAS within a HA set is dynamically assigned the role of the RHAS. In the embodiment shown in FIG. 2, the root HAS of the first set is functional unit 54 whilst in the second set the functional unit providing the root HAS function is functional unit 62. In embodiments of the present invention, one HAS within a HA set is dynamically assigned the role of the root HAS. The remaining HAS of a HA set sends resource states only to the RHAS. In other words, the members of the set only communicate with the root HAS and not other members of the set directly. Thus, the root HAS can be regarded as the HA set owner responsible for populating events across the groups. The assignment and role of RHAS is dynamic and depends upon the start-up sequence and also the processing capabilities. Typically control cards are started first and if there is more than one control card any control card can be made as a RHAS and if the line card is started first it becomes RHAS. Later when control card comes up it can renegotiate to take the role of RHAS.

It is also possible that if there is no difference between control card and line card hardware and software processing then the concept of RHAS will be absent. The card which comes up first will be called master (say master-1), and the card which comes up second will be called slave (say slave-1). The slave will be monitored by master and master will monitor the slave. Later when the third card comes up this card will be monitored by slave-2 and this card will monitor the master-1 card and forms a ring type of state management.

Where there is communication between the groups, typically it will be through Root HAS only, but if the underlying communication medium is shared then everyone can communicate to each other.

Figure 3:
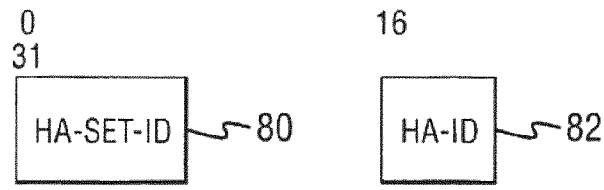
FIG. 3 illustrates the HA server reference.

Reference is now made to FIG. 3 which shows the reference architecture for the HAS. The HAS within a HA set is uniquely identified by a HA identifier (HA-ID). Its value is computed dynamically by the RHAS during set up. Each HAS belongs to a given HA set and the HA set identifier is unique in the network element. Thus, the HA set is identified by separate identifier—the HA set identifier. In the embodiment shown in FIG. 2, each HA server or functional unit is provided with a HA-identifier. Accordingly, in the embodiment shown in FIG. 2, the root HAS has the HA identifier 8 with the remaining functional units having identifiers 10, 11 and 12 respectively. In set 2, the root HAS 62 has the HA-ID 1 with the other members of the set having identities 12, 13 and 14 respectively.

It should be appreciated that in embodiments of the present invention, each functional unit may have a different identifier i.e. a unique identifier. In an alternative embodiment of the present invention, the same identifier may be used in different sets. For example, set 1 could have identifier 1 as well as set 2. However, each functional unit would be uniquely identified by a combination of the set identifier and the HA-ID.

If there is any state change in a HAS belonging to a HA set, then it is communicated to the corresponding RHAS. The RHAS then communicates the updates to other members of the HA set through a unicast connection. It should be appreciated that embodiments of the invention are not only applicable to a unicast scheme but can also work both in broadcast and multicast situations as well.

In order to reference a HAS running under a given network element, the HA-set-ID is concatenated with the HA-ID as shown in FIG. 3. In other words, each functional unit has a HA-SET-ID 80 and a HA-ID 82. These are concatenated together to provide a single identity in embodiments of the present invention.

Figure 4:
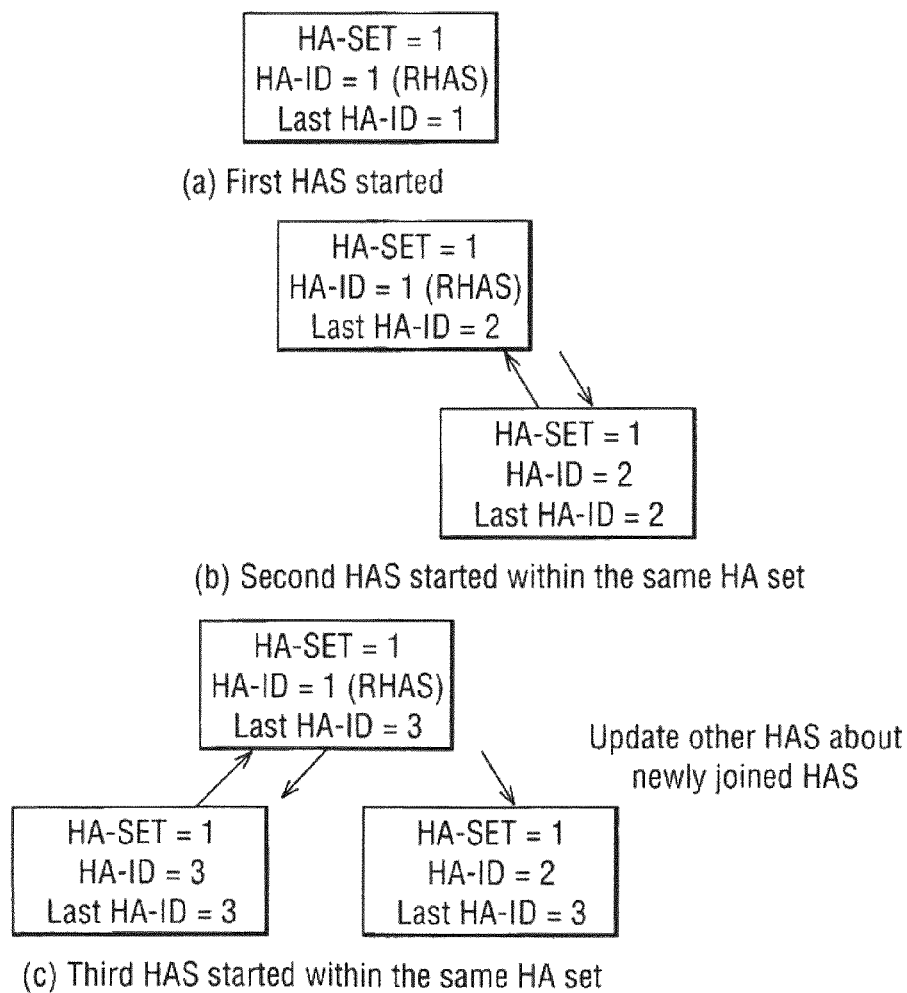
FIG. 4 illustrates the HA identity assignment process.

Reference will now be made to FIG. 4. When a HAS starts in a functional unit, the HAS server needs to make sure whether there are any other HAS belonging to the same HA set running inside the network element. This is done by generating an HA discovery message on a multicast channel which may for example be a layer 2 or layer 3 or other communication channel. There are two possible forms of point-to-multipoint communications. One form is broadcast, where one sends a message and everyone connected in a wire can listen. Another mechanism is that when a sender sends a message, every one will receive the message on the wire but only certain receiver will receive and process this message. This type of communication mechanism is inbuilt in layer-2 like Ethernet or in IP (layer-3) protocol as multicast. If none exists, then the HAS will take the role of root HAS and it will assign itself a HAS-ID 1. This is shown in step a) of FIG. 4.

At a later point, if another HAS becomes active, it will send an HA discovery message on the multicast channel, however, the RHAS will respond to the newly joining HAS. The responsive information contains the details of the HAS end point information. Upon receiving the response message, the joining server connects to the RHAS through a unicast TCP (transmission control protocol). It should be appreciated that embodiments of the present invention are being described using TCP/IP interconnect mechanisms. However, it should be appreciated that embodiments of the present invention may use non-IP interconnections as well. The root HAS computes an HA identity and passes the identity to the new HAS. The computation of the HA-ID is monotonically increasing in value and is always one higher than the previously assigned HA-ID. Thus, after the successful completion of the joining process, the newly joined HAS will have the HA-ID 2 and will send an update regarding its readiness to the root HAS as shown in step b) of FIG. 4. The newly joined HAS will become the back up RHAS. The choice of choosing the backup service can be configured also by the operator.

It should be appreciated that step b) shows a second HAS within the same HA set as the route HAS.

Step c) of FIG. 4 shows the process where a third HAS joins. The joining procedure is the same as described in relation to step b). However, the root HAS will update the other HAS about the newly joined HAS. In other words, the second HAS to join is informed that the third HAS has joined by the root HAS. The third HAS is assigned ID number 3. The third HAS will also establish a connection with the back up Root HAS, that is the second HAS.

The HAS which first becomes active in a HA set will take up the roll of RHAS. If for some reason the active RHAS fails or is being shut down, then the HAS which has the next higher HAS-ID becomes the active RHAS.

Figure 5:
FIG. 5 illustrates the reassignment of a root HA server.
Figure 5:
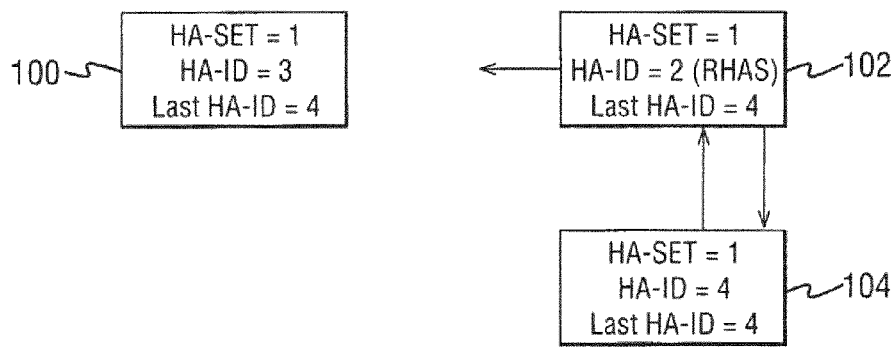

FIG. 5 shows the RHAS assignment procedure. Initially, in step a) of FIG. 5, the HAS with HA-ID 1 is the root RHAS. If this HAS goes down or is shut down, the HAS with the next highest ID which is in this example is the HAS 102 with ID 2 becomes the RHAS. The new route HAS 102 will broadcast this information to the other HASs 103 of the set.

In step b), the HAS 104 that was down comes back and is given a new identity as shown in FIG. 5b. The HAS 104 which earlier had the HA-ID 1 is restarted and will join as a new HAS with a new HA identity which in this case is 4. In other words, it is no longer the root HAS.

In preferred embodiments of the present invention to minimise the fail over time to the new RHAS and reduce the number of messages exchanged, it is recommended that all HAS's should have pre-established transport level connections with the back up HAS. The back up HAS is the pre-assigned back up HAS with a next higher HA-ID that takes the role of RHAS when the current active RHAS fails. Each HAS may be connected to both the RHAS and the back up HAS. This mechanism will reduce the latency time during failure fail over operation. In other words, the time taken to switch between the RHAS and the back up HAS is reduced.

In embodiments of the present invention, the HAS with the next higher identity is selected as the back up or next RHAS. It should be appreciated that this is one implementation only of an embodiment of the present invention and other criteria can be used for selecting the next or back up HAS.

Figure 6:
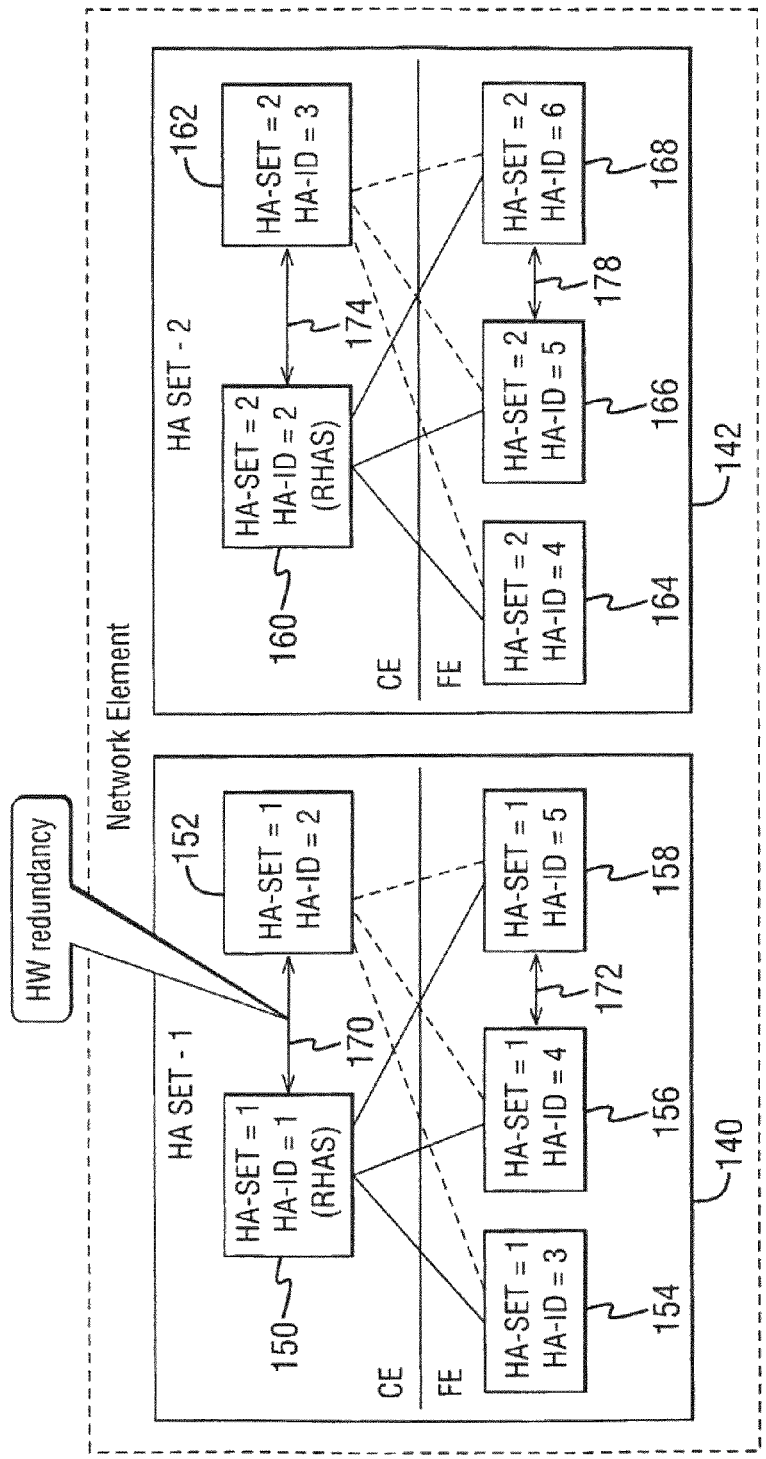
FIG. 6 illustrates the switch over operation in a HA set.

Reference will now be made to FIG. 6 which shows a switch over operation in an HA set. The root HAS within an HAS set synchronises all the states. This means that for seamless continuity, switch over should happen within the HA set and the operator needs to carefully group the similar applications under one HA set for continuous service.

Switch over operation can happen across control cards or across line cards. It may be possible that line cards may have intelligent software running on it and if there is any existing hardware redundancy mechanisms then these should be conveyed to the root HAS during the HAS start up procedure. This way HASs in a HA set know to which HAS to switch in the event of a failure.

FIG. 6 shows switch over operations between line cards and also between control cards in the network element. In the arrangement shown in FIG. 6, there are four control cards with two of them belonging to the first set and the second two belonging to the second set. In particular, control cards 150 and 152 belong to the first set and control cards 160 and 162 belong to the second set. The first set has three line cards 154, 156 and 158. The second set has three line cards 164, 166 and 168. It should be appreciated that the number of control cards and line cards in each set may be the same or different and the numbers shown in FIG. 6 are provided only by way of example. In the arrangement shown in FIG. 6, control card 150 is the root HAS whilst in the second set control card 160 is the root HAS.

In preferred embodiments of the present invention there is a existing hardware redundancy mechanism between the control cards 150 and 152 in the first set and the control cards 160 and 162 in the second set. There is also an existing hardware redundancy mechanism between line cards 156 and 158 in the first set and line cards 166 and 168 in the second set. This hardware redundancy is indicated by respective arrows 170, 172, 174 and 178 between the two cards for which there is redundancy.

Each functional unit runs one instance of the HAS. If the HAS with HA-ID 1 fails in set 1, that is HAS 150, then the HAS with HA-ID 2 in set 1, that is HAS 152 will become the root HAS. In order to provide fast switch over and provide a line card redundancy, the switch over should happen based on the hardware redundancy mechanism. This configuration information needs to be conveyed to the HAS running on the functional unit. In the example shown in FIG. 6, we have one active control card that is card 158 and two standard line cards, that is card 154 and 156. If the active line card fails, then the switch over is done to the line card with ID 4, that is card 156 to take advantage of the existing hardware redundancy mechanism between cards 156 and 158. In other words, if there is an existing hardware redundancy mechanism in place between two of the cards, then in case of a failure of one of those cards, the switch over would be to the other of those cards.

In the arrangement shown in FIG. 6, the HA set owner runs on active CE The HA server will be allowed to run on the control card as in many architectures, CPU and memory are more available in control card rather than in line cards. The HAS running on functional units may get updates from other HAS servers on different functional elements where the service belong to the same HA set. The HAS set owner would synchronise the HAS and RHAS. The service will be switched to 156 if the 154 is active and 156 is standby (that is there is a redundancy mechanism between 154 and 156).

Embodiments of the present invention provide a mechanism, which works well for a heterogeneous HA server. The mechanism uses existing communication mechanism and scales wells for hundreds of HA servers. The mechanism can be made secure by using a asymmetric cryptography when the HA servers are multiple hops away. Most of the time the network element contains one physical chassis and in it, it contains several control and line cards. But there are situations where a network element is composed of several physical chasses and it can be placed at different locations. But all the discrete physical chasses are interconnected via a network. In those cases, the communication mechanism between the line cards and control card can be secured by using cryptographic techniques. The proposed mechanism eliminates unnecessary messaging processing if one of the HA server fails.

High availability is used to describe an entity that has a very low downtime. For example an entity may be required to have a down time of less than 1% to be classed as a high availability entity. This is by way of example only and different measures can be used to classify a high availability entity.

Embodiments of the invention have been described in the context of servers. It should be appreciated that embodiments of the invention will also have application to the organisation of computers or computer units.

In embodiments of the invention, the controlling or root server is able to control predetermined functions of other servers in the set. For example the root server is able to control the communication of information to other servers in the set. The root server may for example be able to control the synchronisation of other servers in the set.

In preferred embodiments of the present invention, the servers in the set may have substantially similar functionality.

The invention claimed is:

1. A device comprising:
   a receiver;
   a transmitter; and
   a controller operatively coupled to the receiver and the transmitter and configured to:
      generate a discovery message after a boot-up procedure;
      send the discovery message on a multicast channel between a plurality of cards;
      determine if a response to the discovery message is received from a root high availability server;

if the response is received, receive an identity from the root high availability server, wherein the identity represents a position in a hierarchy of the plurality of cards, assign the identity to the device, and determine if the root high availability server fails; and if the response is not received at the device or the root high availability server fails, assign a root identity to the device.

2. The device of claim 1, wherein the multicast channel is a layer 2 or a layer 3 communication channel.

3. The device of claim 1, wherein the discovery message is broadcast.

4. The device of claim 1, wherein the controller is further configured to receive a broadcast message from a second card, wherein the broadcast message indicates that the root identity has switched to the second card.

5. The device of claim 1, wherein the controller is further configured to:
receive a second discovery message from a second card; and
send a second response to the second card, wherein the second response indicates the root identity is assigned to the device.

6. The device of claim 5, wherein the controller is further configured to establish a transport level connection between the device and the second card.

7. The device of claim 5, wherein the controller is further configured to determine a second identity for the second card and to send a first indication of the second identity to the second card.

8. The device of claim 7, wherein the controller is further configured to:
receive a third discovery message from a third card,
determine a third identity for the third card, and
send a second indication of the third identity to the second card and to the third card.

9. The device of claim 8, wherein the second card is identified as a backup root card.

10. The device of claim 9, wherein there is a hardware redundancy mechanism between the root high availability server and the second card.

11. The device of claim 9, wherein the controller is further configured to establish a transport level connection between the root high availability server and the third card.

12. The device of claim 11, wherein the controller is further configured to establish a second transport level connection between the second card and the third card.

13. The device of claim 1, wherein the controller is further configured to receive an update from a second card if the root identity is assigned to the device, wherein the update indicates a state change at the second card.

14. The device of claim 13, wherein the controller is further configured to communicate the state change to a third card.

15. A method of organizing a plurality of cards, the method comprising:
generating a discovery message at a first card after a boot-up procedure;
sending the discovery message on a multicast channel from the first card to the plurality of cards;
determining if a response to the discovery message is received from a root high availability server;
if the response to the discovery message is received at the first card, receiving an identity from the root high availability server, wherein the identity represents a position in a hierarchy of the plurality of cards, assigning the identity to the first card, and determining if the root high availability server fails; and if the response to the discovery message is not received at the first card or the root high availability server fails, assigning a root identity to the first card at the first card.

16. The method of claim 15, wherein the multicast channel is a layer 2 or a layer 3 communication channel.

17. The method of claim 15, wherein the discovery message is broadcast.

18. The method of claim 15, further comprising, after receiving the identity, receiving a broadcast message at the first card from a third card, wherein the broadcast message indicates that the root identity has switched to the third card.

19. The method of claim 15, further comprising:
if the first card is assigned the root identity, receiving a second discovery message at the first card from a second card and
sending a second response to the second card from the first card, wherein the second response indicates that the first card is assigned the root identity.

20. The method of claim 19, further comprising establishing a transport level connection between the first card and the second card.

21. The method of claim 19, further comprising determining a second identity for the second card at the first card and sending a first indication of the second identity to the second card from the first card.

22. The method of claim 21, further comprising:
receiving a third discovery message at the first card from a third card,
determining a third identity for the third card at the first card, and
sending a second indication of the third identity to the second card and to the third card from the first card.

23. The method of claim 22, wherein the second card is identified as a backup root card.

24. The method of claim 23, wherein there is a hardware redundancy mechanism between the first card and the second card.

25. The method of claim 23, further comprising establishing a transport level connection between the first card and the second card.

26. The method of claim 25, further comprising establishing a second transport level connection between the third card and the second card.

27. The method of claim 15, further comprising, if the first card is assigned the root identity, receiving an update from a third card at the first card, wherein the update indicates a state change at the third card.

28. The method of claim 27, further comprising, communicating the state change to a second card from the first card.

29. A non-transitory computer readable media comprising instructions stored thereon, the instructions comprising:
instructions to generate a discovery message at a first card after a boot-up procedure;
instructions to send the discovery message on a multicast channel from the first card to a plurality of cards;
instructions to determine if a response to the discovery message is received from a root high availability server;
instructions to, if the response to the discovery message is received at the first card, receive an identity from the root high availability server, wherein the identity represents a position in a hierarchy of the plurality of cards, assign the identity to the first card, and determine if the root high availability server fails; and
instructions to, if the response to the discovery message is not received at the first card or the root high availability server fails, assign a root identity to the first card.

30. The non-transitory computer readable media of claim 29, wherein the multicast channel is a layer 2 or a layer 3 communication channel.

31. The non-transitory computer readable media of claim 29, wherein the discovery message is broadcast.

32. The non-transitory computer readable media of claim 29 further comprising instructions to receive a broadcast message from a second card, after receiving the identity, wherein the broadcast message indicates that the root identity has switched to the second card.

33. The non-transitory computer readable media of claim 29 further comprising:
instructions to receive a second discovery message from a second card if the first card is assigned the root identity, and
instructions to send a second response to the second card, wherein the second response indicates that the first card is assigned the root identity.

34. The non-transitory computer readable media of claim 33 further comprising instructions to establish a transport level connection between the card and the second card.

35. The non-transitory computer readable media of claim 33 further comprising:
instructions to determine a second identity for the second card at the first card and
instructions to send a first indication of the second identity to the second card.

36. The non-transitory computer readable media of claim 35 further comprising:
instructions to receive a third discovery message from a third card,
instructions to determine a third identity for the third card, and
instructions to send a second indication of the third identity to the second card and to the third card.

37. The non-transitory computer readable media of claim 34, wherein the second card is identified as a backup root card.

38. The non-transitory computer readable media of claim 36, wherein there is a hardware redundancy mechanism between the first card and the second card.

39. The non-transitory computer readable media of claim 36 further comprising instructions to establish a transport level connection between the first card and the second card.

40. The non-transitory computer readable media of claim 39 further comprising instructions to establish a second transport level connection between the second card and the third card.

41. The non-transitory computer readable media of claim 29 further comprising instructions to receive an update from a second card if the first card is assigned the root identity, wherein the update indicates a state change at the second card.

42. The non-transitory computer readable media of claim 41 further comprising instructions to communicate the state change to a third card.

* * * * *

UNITED STATES PATENT AND TRADEMARK OFFICE
CERTIFICATE OF CORRECTION

PATENT NO.        : 8,161,147 B2                                    Page 1 of 1
APPLICATION NO.   : 11/046805
DATED             : April 17, 2012
INVENTOR(S)       : Verma et al.

It is certified that error appears in the above-identified patent and that said Letters Patent is hereby corrected as shown below:

On the Face Page, in Field (54), in Title, and in Column 1, Line 1,
delete "ORGANISING" and insert -- ORGANIZING --, therefor.

On the Face Page, in Field (56), under "OTHER PUBLICATIONS", in Column 2,
Line 12, delete "714/4" and insert -- 714/4.4 --, therefor.

On the Face Page, in Field (56), under "OTHER PUBLICATIONS", in Column 2,
Line 17, delete "714/47" and insert -- 714/47.3 --, therefor.

In Column 1, Line 5, delete "organising" and insert -- organizing --, therefor.

In Column 1, Line 47, delete "distruption." and insert -- disruption. --, therefor.

In Column 4, Line 51, delete "element" and insert -- element. --, therefor.

In Column 6, Line 37, delete "ie" and insert -- i.e. --, therefor.

In Column 8, Line 36, delete "newlyjoining" and insert -- newly joining --, therefor.

In Column 9, Line 56, delete "a existing" and insert -- an existing --, therefor.

In Column 10, Line 28, delete "a asymmetric" and insert -- an asymmetric --, therefor.

In Column 13, Line 21, in Claim 34, after "between the", insert -- first --.

Signed and Sealed this
Eighteenth Day of September, 2012

David J. Kappos
*Director of the United States Patent and Trademark Office*